US011517945B2

(12) United States Patent
Haughton

(10) Patent No.: US 11,517,945 B2
(45) Date of Patent: Dec. 6, 2022

(54) APPARATUS AND METHOD FOR RECYCLING

(71) Applicant: WRIGHTS RECYCLING MACHINERY LTD, Baildon Shipley (GB)

(72) Inventor: Ralph Haughton, Baildon Shipley (GB)

(73) Assignee: WRIGHTS RECYCLING MACHINERY LTD, Baildon Shipley (GB)

( * ) Notice: Subject to any disclaimer, the term of this patent is extended or adjusted under 35 U.S.C. 154(b) by 24 days.

(21) Appl. No.: 16/948,232

(22) Filed: Sep. 9, 2020

(65) Prior Publication Data

US 2021/0069759 A1    Mar. 11, 2021

(30) Foreign Application Priority Data

Sep. 10, 2019  (GB) ...................... 1913006

(51) Int. Cl.
| | |
|---|---|
| B08B 13/00 | (2006.01) |
| B08B 7/04 | (2006.01) |
| B08B 1/00 | (2006.01) |
| B08B 1/02 | (2006.01) |
| B08B 3/04 | (2006.01) |
| B08B 3/08 | (2006.01) |
| B08B 7/02 | (2006.01) |
| B65H 18/14 | (2006.01) |

(52) U.S. Cl.
CPC ............... *B08B 7/04* (2013.01); *B08B 1/001* (2013.01); *B08B 1/02* (2013.01); *B08B 3/042* (2013.01); *B08B 3/08* (2013.01); *B08B 7/02* (2013.01); *B65H 18/145* (2013.01); *B65H 2406/20* (2013.01); *B65H 2515/842* (2013.01)

(58) Field of Classification Search
None
See application file for complete search history.

(56) References Cited

U.S. PATENT DOCUMENTS 5,263,591 A * 11/1993 Taormina ................ B07B 13/18
209/703

FOREIGN PATENT DOCUMENTS

WO    WO-2013042816 A1 *  3/2013  ............. B07B 13/11

OTHER PUBLICATIONS

Google Patents translation of WO2013042816A1 retrieved from https://patents.google.com/patent/WO2013042816A1/en?oq=wo2013042816 on Mar. 9, 2022 (Year: 2020).*

* cited by examiner

*Primary Examiner* — Eric W Golightly
(74) *Attorney, Agent, or Firm* — McKee, Voorhees & Sease, PLC

(57) ABSTRACT

The present invention provides an apparatus for recycling artificial or synthetic layered materials. The apparatus includes a first conveying section arranged to receive and unroll a used or pre-processed roll of artificial or synthetic layered material, in use, and at least a second conveying section arranged to receive and re-roll the subsequently processed roll of said material. The apparatus further includes a beating section located intermediate said first and second conveying sections, arranged to beat and/or agitate said unrolled material as it is moved from the first conveying section to the at least second conveying section, in use.

16 Claims, 1 Drawing Sheet

APPARATUS AND METHOD FOR RECYCLING

CROSS-REFERENCE TO RELATED APPLICATIONS

This application claims priority under 35 U.S.C. § 119 to GB Application Serial No. 1913006.1, filed on Sep. 10, 2019, which is herein incorporated by reference in its entirety including without limitation, the specification, claims, and abstract, as well as any figures, tables, or examples thereof.

BACKGROUND OF THE INVENTION

Field of the Invention

The invention to which this application relates is an apparatus and method for recycling. In particular, the following description refers to an apparatus and process for recycling artificial or synthetic grass. However, while the following description refers almost exclusively to addressing this issue, the skilled person will appreciate the apparatus and process of the present invention may also be used for recycling other synthetic products.

Description of Related Art

Astroturf, also known as artificial or synthetic grass (AG) comes in many forms and has many different uses. It is generally used in areas where grass cannot grow, or in areas where grass maintenance is impossible, difficult, or undesired. AG is used mainly in sports stadiums and arenas but can also be found on playgrounds and in other spaces, even in domestic properties as a garden turf replacement. The main components of AG comprise up to seven different layers: fibres; infill; backing; seaming; turf lock; shock pad; and base layer. The layers can be built up in different materials and combinations of materials in order to achieve different properties required for different sports and activities.

Generally, the lifespan of an AG installation in a garden, sports field, stadium or other will be between 10-15 years, at which point it will need to be replaced. The old AG installation consequently is removed but many of the materials can be reused or recycled and, as such, it will be taken for processing and recycling. A consequence of all the various materials mentioned above forming all these layers, plastics, sand, rubber, aggregates glues, tapes etc. is that the recycling process has to cope with all these materials and the degradation each has encountered over the 10-15 years it has been in situ. Furthermore, the recycling process also has to remove from these materials all dirt and rubbish deposited upon it over those years. While most artificial grass is made of plastic materials, including polypropylene, polyethylene, latex and polyurethane, which can all easily be recycled, it also contains infill. The materials that are used for infill, such as sand, are difficult to separate from the recyclable components of artificial grass. The issue of recycling lies in separating all of the materials that are used to create synthetic turf so that they can be recycled properly. For that reason, it was much easier—and less expensive—to simply toss fake grass into a landfill. In fact, this is likely why so many people believed, for so long, that this landscaping material could not be recycled.

When old AG is removed from the area from which it has been laid it is usually processed in such a way as to roll strips of the AG in order to facilitate easier transport and storage. Traditionally the process of recycling involves these rolls of used AG being placed in large shredders and ground down into small pieces. The process of separating out the component parts can then begin. The problem with this method is that the sand in the AG has a very abrasive effect on the wear components of the shredder. One way of overcoming this is to use industrial vacuum cleaners to remove the sand and rubber before lifting and rolling the AG but this is only partially successful as the sand has become compacted in the base of the AG 'tufts' and much of the sand and rubber is left behind. The vacuuming process is also quite labour intensive and time consuming and requires the separate transportation of the sand/rubber mix afterwards. Furthermore, it is often the case that the plastics, whilst being adequately separated from other products like the sand and rubber, are not separated one plastic from the other. This usually results in all the plastics being classed as low grade and where re-use of the plastics does occur, it is in low-grade products such as drainage pipes.

BRIEF SUMMARY OF THE INVENTION

It is therefore an aim of the present invention to provide an improved apparatus for recycling artificial or synthetic layered materials.

It is a further aim of the present invention to provide a method of recycling artificial or synthetic layered materials.

According to a first aspect of the invention there is provided an apparatus for recycling artificial or synthetic layered materials, said apparatus including:
- a first conveying section arranged to receive and unroll a used or pre-processed roll of artificial or synthetic layered material, in use;
- at least a second conveying section arranged to receive and re-roll the subsequently processed roll of said material; and
- characterized in that the apparatus further includes a beating section located intermediate said first and second conveying sections, arranged to beat and/or agitate said unrolled material as it is moved from the first conveying section to the at least second conveying section, in use.

Typically, said artificial or synthetic layered material is an artificial or synthetic grass (AG). Preferably, said material includes a top layer, said top layer comprising a fibre layer having a plurality of blades of artificial or synthetic grass. Typically, said fibre layer may be formed from nylon, polypropylene (PPE) or polyethylene (PE). Typically, infill materials may be dispersed within the fibre layer and between blades of artificial or synthetic grass. Such infill materials may include any or any combination of organic coconut fibres and cork; pea gravel and rubber; and/or sand and rubber.

In one embodiment, said first conveying section includes one or more conveying members, provided to unroll and pass said material along the apparatus, in use.

In one embodiment, said first conveying section is arranged to present said material, in use, to said beating section in an inverted manner. That is to say, a top side or layer of said material is arranged to face down, and an underside of said material is arranged to face upwardly, in use.

Preferably, said beating section includes at least a first beating member. Typically, said first conveying section is arranged to unroll and expose/present an underside of said material to said beating member, in use.

In one embodiment, said beating member is arranged to beat and/or agitate an underside of said material to dislodge, expel and/or remove debris, infill and other such particulates from a top side or layer of the material, in use.

In one embodiment, said beating member may be provided as an elongate member, having a longitudinal axis substantially perpendicular to the path of the material being moved from the first conveying section to the second conveying section, in use. Typically, said beating member may be provided having a substantially, square, rectangular, triangular or other such profile in cross-section.

In one embodiment, said beating member may be rotatable and/or pivotable and/or may be arranged to oscillate about a longitudinal axis thereof. Typically, corners and or edges of said beating member may be arranged to impact, grind, slide and/or move along or on an underside of the material, in use. Such movement is provided to aid in "fanning out" blades and/or fibres provided on the top side or layer of the material, thereby loosening and/or removing debris, infill etc. located therebetween.

In one embodiment, said beating member may be movable in substantially vertical and/or horizontal directions, or in curved paths, so as to impact said material in different manners, in use.

In one embodiment, the speed of movement, rotation, pivoting, and/or oscillating of the beating member may be varied by a user, in use.

In one embodiment, two or more beating members may be provided in said beating section. In another or an additional embodiment, said beating section may include a plurality of beating members, wherein said beating members may be provided as hammer or mallet members.

In one embodiment, said beating section may further include a liquid inlet portion. Typically, said liquid inlet portion is arranged to permit the inlet and flow of liquid across, over and/or around said material, in use. Preferably, said liquid inlet portion is arranged to provide a flow of liquid substantially perpendicular to the path of the material being moved from the first conveying section to the second conveying section, in use.

The provision of a liquid inlet portion serves to wash/rinse and remove debris, infill and other such particulates from the material, in use. When dry, the debris or particulates may still hang in the air surrounding the material and thus may not fully be dislodged or removed therefrom; the provision of a means to inject liquid on and across the material aids in trapping the particulates and washes/rinses them away from the material.

In one embodiment, liquid outlet means is provided for the outflow of liquid and debris/particulates trapped or contained therein. The liquid containing the debris and particulates may subsequently be processed to separate the materials contained therein for subsequent recycling and/or reuse.

In one embodiment, said liquid may be water. Typically, said liquid may further include other solvents/solutions or materials therein. Typically, said solutions or materials may include disinfectants and/or coagulants. These may be provided to aid in the removal of debris and particulates from the material and also to clean and disinfect the material.

In one embodiment, said second conveying section includes one or more conveying members, provided to receive and re-roll said material after processing by said beating section, in use.

Preferably, the direction and speed of movement in said first and second conveying sections may be altered by a user, in use. This therefore enables a user to determine the speed and direction of movement of the material through the beating section to ensure it is fully or substantially fully removed of debris, infill and other such particulates.

In one embodiment, one or more conveyor members of said first and second conveying sections may be movable or pivotable, so as to expose or present an underside of said material to the at least one beating member in a desired position, in use.

Typically, one or more guide members may be provided to guide the path of movement of the material along the apparatus, in use.

The present invention therefore provides an apparatus which serves to recycles or repurpose artificial or synthetic layered materials in a far more effective and efficient manner. Most typically, the apparatus of the present invention may be used for the recycling/repurposing of artificial or synthetic grass (AG) and, importantly, provides a means by which to thoroughly remove all or at least the vast majority of the infill, debris and other particulates that are present or amass over time in between the blades or fibres of the top layer of the AG. The debris may predominantly be composed of sand and/or rubber which has been incorporated into the AG as infill; sand in particular is very abrasive and can cause significant damage to the components of machines used to shred the AG. This debris may also include rivets, nails and other particulates which may have amassed on the top layer of the AG during its lifespan. Furthermore, the sand and rubber in particular can be reused as infill in future AG installations and, consequently, it is advantageous to provide a means by which such material can be filtered, separated and subsequently reused—this saves money on at least two fronts as there is no need to acquire new rubber or sand, and far less damage is caused to shredding machinery meaning any repair or replacement costs of component parts are significantly reduced or eliminated entirely.

In another aspect of the present invention, there is provided a method of recycling artificial or synthetic layered materials using an apparatus as described above, said method including the steps of:

locating a used or pre-processed roll of artificial or synthetic layered material on a first conveying section of said apparatus;

unrolling said material along said first conveying section;

guiding said material to a second conveying section wherein the subsequently processed material is re-rolled;

characterized in that said material is passed through a beating section of the apparatus, intermediate said first and second conveying sections, wherein said unrolled material is beaten and/or agitated to expel debris, infill and other such particulates therefrom as it is moved from the first conveying section to the at least second conveying section.

Typically, said artificial or synthetic layered material is an artificial or synthetic grass (AG). Preferably, said material includes a top layer, said top layer comprising a fibre layer having a plurality of blades of artificial or synthetic grass.

In one embodiment, said first conveying section unrolls and moves said material therealong, and presents the material to said beating section in an inverted manner. That is to say, a top side or layer of said material is arranged to face down, and an underside of said material is arranged to face upwardly.

Typically, said beating section includes at least a first beating member and said first conveying section unrolls and exposes/presents an underside of said material to said beating member.

In one embodiment, said first and second conveying sections each include one or more conveying members, said conveying members movable or pivotable so as to expose or present an underside of said material to the at least one beating member in a desired position.

In one embodiment, said beating section further includes a liquid inlet portion permitting the inlet and flow of liquid across, over and/or around said material. Preferably, said liquid inlet portion provides a flow of liquid substantially perpendicular to the path of the material being moved from the first conveying section to the second conveying section.

BRIEF DESCRIPTION OF THE SEVERAL VIEWS OF THE DRAWINGS

Embodiments of the present invention will now be described with reference to the accompanying figures, wherein.

DETAILED DESCRIPTION OF EXEMPLARY EMBODIMENTS ACCORDING TO THE INVENTION

Referring now to the Figures, there is shown an apparatus 1 provided for the recycling and/or repurposing of artificial or synthetic layered materials, in particular, artificial or synthetic grass (AG). This is shown in the figures as a roll of artificial grass 3. The apparatus includes a first conveying section, which in one embodiment of the invention illustrated in the figures comprises a first pair of conveyors 5', 5", on which the artificial grass 3 is initially placed, and a further conveyor 7 along which the artificial grass 3 is passed. The artificial grass 3 includes a top layer comprising a fibre layer having a plurality of blades of artificial or synthetic grass. The fibre layer may be formed from nylon, polypropylene (PPE) or polyethylene (PE). Infill materials are generally dispersed within the fibre layer and between the blades of artificial or synthetic grass. The artificial grass 3 passes along the conveyor 7 to a second conveying section, which in this embodiment includes a pair of conveyors 9', 9" positioned to receive and re-roll the subsequently processed artificial grass 3. Located intermediate the first and second conveying sections of the apparatus 1, there is provided a beating section—the section wherein the used artificial grass 3 is processed in a first stage of its recycling/repurposing process. The beating section includes at least a first beater 11.

Figure 1A:
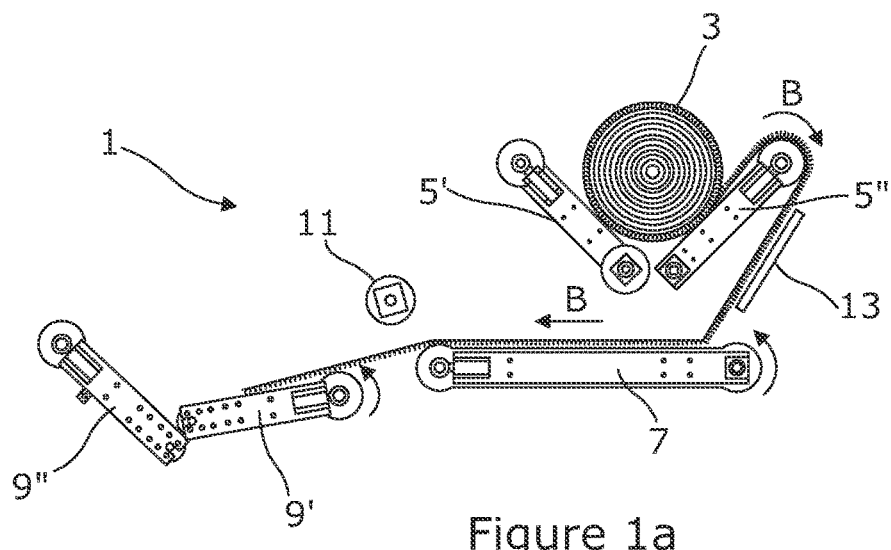
FIGS. 1a-c illustrate schematics of an apparatus for recycling artificial or synthetic layered materials in sequential stages throughout a recycling process, in accordance with an embodiment of the present invention.

The artificial grass 3 is unrolled from its first resting position, shown in FIG. 1a, along conveyors 5', 5" and toward the second conveyor 7, aided by a guide member 13, such that the artificial grass 3 is inverted along the path of the apparatus 1. That is to say, the top side or layer is arranged to face down along the conveyor 7, and an underside is arranged to face upwardly. The artificial grass 3 passes from the first conveying section to the second conveying section in this manner, presenting or exposing the underside thereof to the beater 11. The conveyors 7, 9' are pivotable from their resting positions so as to be able to raise the artificial grass 3 closer to the beater 11 (shown in FIG. 1b) while also aiding in "fanning out" blades and/or fibres provided on the top side or layer of the material, thereby loosening and/or removing debris, infill etc. located therebetween. The beater 11, provided as an elongate member located across the width of the artificial grass 3 being passed along the apparatus 1 may then be activated by a user to rotate, pivot or oscillate about its longitudinal axis, or move in vertical, horizontal or curved paths as desired by a user so as to impact on, beat, agitate, grind, roll or move along the underside of the artificial grass and essentially hammer, roll, expel or beat out from the top fibre layer of the artificial grass 3 debris, infill and other such particulates therefrom. The speed of such movements may also be varied, as required. The debris/particulates may drop under gravity from the artificial grass 3 and the grass 3, once sufficiently beaten may continue along the path of the conveyor 7 to be re-rolled in conveyors 9', 9", free of all or the vast majority of infill, debris and particulates etc. The beater 11 may be provided having a shaped profile in cross-section. Typically, such shapes may include substantially, square (as shown in the figures), rectangular, triangular or other such profiles in cross-section. Consequently, upon movement of the beater 11, corners and or edges thereof may be arranged to impact, grind, slide and/or move along or on the underside of the grass 3, serving to expel particulates from the grass 3.

The beating section of the apparatus 1 of the present invention may also include a liquid inlet portion, provided in the form of one or more water jets which are arranged to inject water across, over and/or around the artificial grass 3 as it is being beaten by the beater 11. The injection of water is provided to be substantially perpendicular to the path of grass 3 being moved along the apparatus 1, as shown by Arrow A. The provision of one or more water jets A serves to wash/rinse and remove debris, infill and other such particulates from artificial grass 3. When dry, i.e. in the absence of waters jets, the debris or particulates may still hang in the air surrounding the grass 3 and thus may not be fully dislodged or removed therefrom; the provision of a means to inject liquid on and across the grass 3 aids in trapping the particulates and washes/rinses them away from the grass 3. An outlet is also provided to enable the outflow of water and the collected/trapped debris/infill/particulates. This is particularly useful as the debris and particulates may subsequently be processed to separate the materials contained therein for subsequent recycling and/or reuse. The sand and rubber present in particular can be reused as infill in future AG installations and, consequently, it is advantageous to provide a means by which such material can be filtered, separated and subsequently reused. While water is the most convenient liquid to use to wash and rinse the AG 3, it may also be desirable to include other substances with it. For example, it may be beneficial to include coagulants into the water mixture to aid in the trapping and collection of the debris and/or include an amount of disinfectant also, which will serve to disinfect the AG 3 as it is being processed.

The present invention therefore provides an apparatus 1 which serves to recycles or repurpose artificial or synthetic grass 3 in a far more effective and efficient manner than what is currently known or available in the prior art. Importantly, the apparatus 1 provides a means by which to thoroughly remove all or at least the vast majority of the infill, debris and other particulates that are present or amass over time in between the blades or fibres of the top layer of the AG 3.

Figure 1B:
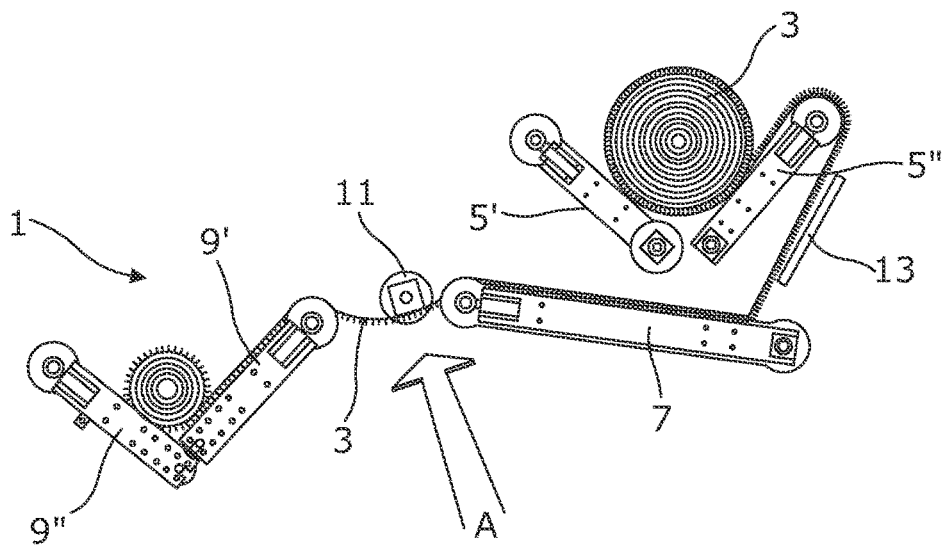
Figure 1C:
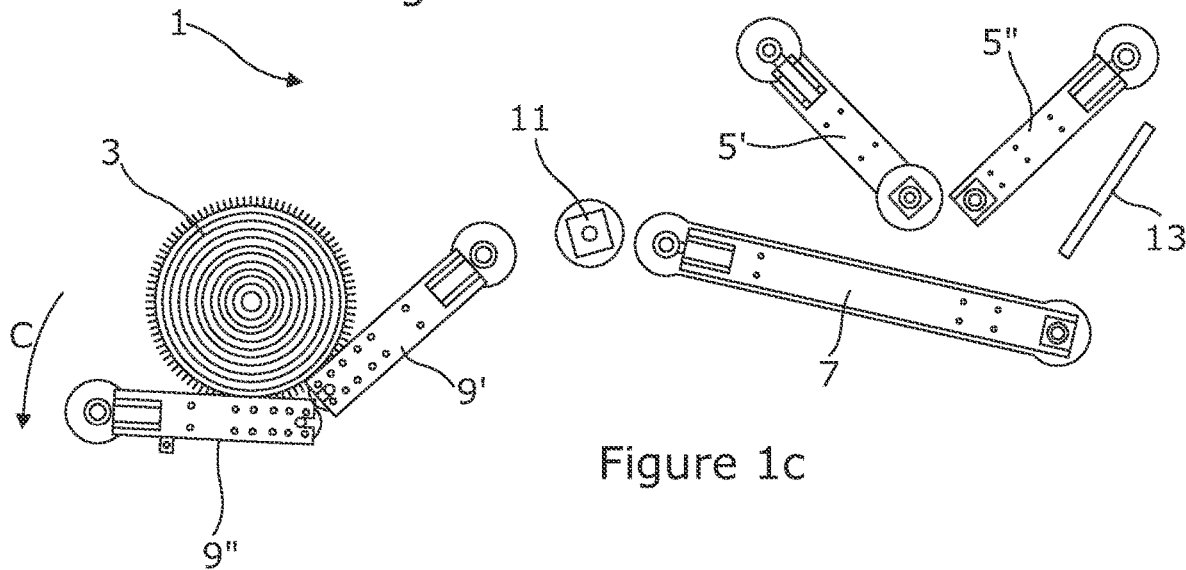

In a specific embodiment of the present invention, rolls of discarded AG 3 are placed into the apparatus 1, complete with sand and rubber infill. A first pair of conveyors 5', 5" then work to unroll the AG 3 with the free end of the AG 3 moving towards a single conveyor 7 (along Arrows B) which in turn directs the free end of the AG 3 to a second pair of conveyors 9', 9" which re-roll the AG 3. The single conveyor 7 and one of the second pair of conveyors 9' then articulate (i.e. pivot upwardly as shown in FIG. 1b) so as to present the backing or underside of the AG 3 to a roller/beater 11. The roller/beater 11 presses on to the backing or underside of the AG 3, opening up the tufts or blades of synthetic "turf" from one another so that the beating action of the roller/beater 11 dislodges the rubber, compacted sand and other debris contained therein. This action is further facilitated by the provision of water jets (arrow A) which help to both wash away the sand and rubber infill while cleaning all the materials at the same time. The second pair of conveyors 9', 9" then complete this part of the process by re-rolling the AG 3. The components of the second pair of conveyors 9', 9" then move to eject the roll of AG 3 from these conveyors—conveyor 9" may simply pivot downwardly (arrow C) to allow easy removal of the processed AG 3. The newly re-rolled AG 3 can then go directly to the next stage of processing/shredding or into storage. In order to achieve the maximum reclaim of sand and rubber at this stage it is possible to slow, stop even reverse the process to allow the roller/beater 11 more time to efficiently process the material.

The invention claimed is:

1. An apparatus for recycling artificial or synthetic layered materials, said apparatus comprising:
    a first conveying section arranged to receive and unroll a used or pre-processed roll of artificial or synthetic layered material, in use;
    at least a second conveying section arranged to receive and re-roll the subsequently processed roll of said material;
    a beating section located intermediate said first and second conveying sections, arranged to beat and/or agitate said unrolled material as it is moved from the first conveying section to the at least second conveying section, in use;
    wherein said first conveying section is arranged to present said material, in use, to said beating section in an inverted manner, and said beating section includes at least a first beating member, arranged to beat and/or agitate an underside of said material to dislodge, expel and/or remove debris, infill and other such particulates from a top side or layer of the material, in use, and
    said beating section further includes a liquid inlet portion, arranged to permit the inlet and flow of liquid across, over and/or around said material in a a direction substantially perpendicular to a path of the material being moved from the first conveying section to the second conveying section, in use.

2. The apparatus according to claim 1, wherein said first conveying section includes one or more conveying members, provided to unroll and pass said material along the apparatus, in use.

3. The apparatus according to claim 1, wherein said beating member is provided as an elongate member, having a longitudinal axis substantially perpendicular to the path of the material being moved from the first conveying section to the second conveying section, in use.

4. The apparatus according to claim 3, wherein said beating member is rotatable and/or pivotable and/or arranged to oscillate about a longitudinal axis thereof.

5. The apparatus according to claim 3, wherein said beating member is movable in substantially vertical and/or horizontal directions, or in curved paths, so as to impact said material in different manners, in use.

6. The apparatus according to claim 1, wherein two or more beating members may be provided in said beating section.

7. The apparatus according to claim 1, wherein a liquid outlet means is provided for the outflow of liquid and debris/particulates trapped or contained therein.

8. The apparatus according to claim 1, wherein said liquid is water.

9. The apparatus according to claim 8, wherein said liquid further includes other solvents/solutions or materials therein.

10. The apparatus according to claim 1, wherein said second conveying section includes one or more conveying members, provided to receive and re-roll said material after processing by said beating section, in use.

11. The apparatus according to claim 1, wherein the direction and speed of movement in said first and second conveying sections are adjustable by a user, in use.

12. The apparatus according to claim 1, wherein one or more conveyor members of said first and second conveying sections are provided to be movable or pivotable, so as to expose or present an underside of said material to at least one beating member, provided in the beating section, in a desired position, in use.

13. The apparatus according to claim 1, wherein one or more guide members are provided to guide the path of movement of the material along the apparatus, in use.

14. A method of recycling artificial or synthetic layered materials using an apparatus, said method including the steps of:
    locating a used or pre-processed roll of artificial or synthetic layered material on a first conveying section of said apparatus;
    unrolling said material along said first conveying section so as to present the material to a beating section of the apparatus, intermediate the first and a second conveying sections, in an inverted manner;
    guiding said material to the second conveying section of the apparatus wherein the subsequently processed material is re-rolled;
    passing said material through the beating section of the apparatus, such that an underside of said unrolled material is beaten and/or agitated by at least a first beating member to dislodge, expel and/or remove debris, infill and other such particulates from a top side or layer of the material, as it is moved from the first conveying section to the at least second conveying section;
    and wherein said beating section includes a liquid inlet portion permitting the inlet and flow of liquid across, over and/or around said material in a direction substantially perpendicular to a path of the material being moved from the first conveying section to the second conveying section said first conveying section is arranged to receive and unroll a used or pre-processed roll of artificial or synthetic layered material, in use; and said at least second conveying section is arranged to receive and re-roll the subsequently processed roll of said material.

15. The method according to claim 14, wherein said first and second conveying sections each include one or more conveying members, said conveying members movable or pivotable so as to expose or present an underside of said material to at least one beating member, provided in the beating section, in a desired position.

16. The apparatus of claim 9 wherein the other solvents/solutions or materials comprise one or more of disinfectants and coagulants.

\* \* \* \* \*